(12) United States Patent
Son et al.

(10) Patent No.: US 9,889,792 B2
(45) Date of Patent: Feb. 13, 2018

(54) AUTOMOTIVE LAMP

(71) Applicant: SL Corporation, Daegu (KR)

(72) Inventors: Youngho Son, Daegu (KR); Byoungki Ji, Daegu (KR); Hyejin Han, Daegu (KR); Jinhee Yu, Daegu (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/606,938

(22) Filed: May 26, 2017

(65) Prior Publication Data

US 2017/0259731 A1    Sep. 14, 2017

Related U.S. Application Data

(63) Continuation-in-part of application No. 13/313,616, filed on Dec. 7, 2011, now Pat. No. 9,688,188.

(30) Foreign Application Priority Data

Jul. 8, 2011    (KR) .................. 10-2011-0067889

(51) Int. Cl.
  *B60Q 1/00*      (2006.01)
  *B60Q 1/26*      (2006.01)
  *B60Q 1/30*      (2006.01)
  *B60Q 1/48*      (2006.01)
  *B60Q 1/22*      (2006.01)
  *F21S 8/10*      (2006.01)
  *B60Q 1/02*      (2006.01)

(52) U.S. Cl.
  CPC .............. *B60Q 1/30* (2013.01); *B60Q 1/22* (2013.01); *B60Q 1/48* (2013.01); *F21S 8/10* (2013.01); *F21S 48/234* (2013.01); *B60Q 1/02* (2013.01); *B60Q 1/26* (2013.01); *B60Q 2400/50* (2013.01); *F21S 48/20* (2013.01); *F21S 48/23* (2013.01)

(58) Field of Classification Search
  CPC ........ B60Q 1/50; B60Q 2200/00; B60Q 1/22; B60Q 1/30; B60Q 2400/50; B60Q 1/00; F21S 8/10; F21S 48/234; F21S 48/20; F21S 48/23
  USPC .......................................... 362/487; 340/435
  See application file for complete search history.

(56) References Cited

U.S. PATENT DOCUMENTS

| | | | |
|---|---|---|---|
| 2003/0146827 A1* | 8/2003 | Koike | B60Q 1/484 340/435 |
| 2008/0165548 A1* | 7/2008 | Misawa | B60Q 1/2607 362/487 |
| 2008/0175012 A1* | 7/2008 | Shimaoka | B60Q 1/085 362/464 |

* cited by examiner

*Primary Examiner* — Elmito Breval
*Assistant Examiner* — Jessica M Apenteng
(74) *Attorney, Agent, or Firm* — Mintz Levin Cohn Ferris Glovsky and Popeo, P.C.; Kongsik Kim; Colleen H. Witherell

(57) ABSTRACT

The present disclosure provides an automotive lamp, and more particularly, to an automotive lamp capable of informing an ambient vehicle approaching from one side behind the vehicle of a vehicle state by irradiating light of a road pattern to indicate the vehicle state to an area behind the vehicle. The automotive lamp includes a lamp unit disposed in a rear lamp housing of a vehicle and a detection unit configured to detect whether a reverse shift stage is selected. The lamp unit is configured to irradiate a first light distribution pattern that forms a reversing light signal pattern in the rearward direction of the vehicle, and a second light distribution pattern that forms a road pattern on the rearward road surface of the vehicle. The first light distribution pattern and the second light distribution pattern are formed simultaneously, when the reverse shift stage is selected.

19 Claims, 22 Drawing Sheets

AUTOMOTIVE LAMP

CROSS-REFERENCE TO RELATED APPLICATION

This application is a continuation-in-part of U.S. patent application Ser. No. 13/313,616 filed on Dec. 7, 2011, which claims priority from Korean Patent Application No. 10-2011-0067889 filed on Jul. 8, 2010, the contents of which in its entirety are herein incorporated by reference.

BACKGROUND

1. Field of the Invention

The present invention relates to an automotive lamp, and more particularly, to an automotive lamp capable of informing an ambient vehicle approaching from one side behind the vehicle of a vehicle state by irradiating light of a road pattern indicating the vehicle state to an area behind the vehicle.

2. Description of the Related Art

Generally, a vehicle includes various lamps having a lighting function for enabling a driver to easily recognize objects around the vehicle when driving at night and a signaling function for informing drivers of other vehicles or pedestrians about a driving state of the vehicle. For example, a head lamp and a fog lamp are used to provide a lighting function, and a blinker, a reversing lamp, a stop lamp and a side marker are used to provide a signaling function. Among them, the reversing lamp is turned on in the reverse movement of the vehicle to inform other drivers of the reverse movement such that other drivers can make preparations. In this case, since the reversing lamp is installed on the rear side of the vehicle, it is difficult for a vehicle approaching from a left or right side behind the vehicle to check the reversing lamp. Accordingly, a vehicle accident due to failing to recognize the reverse movement of the vehicle may occur.

Further, when a driver opens a door of the vehicle and exits the vehicle, another vehicle approaching from one side in front of the vehicle can determine that the driver exits the vehicle, whereas it is difficult for another vehicle approaching from one side behind the vehicle to determine that the driver has exited the vehicle. Accordingly, there is a demand for a method enabling other vehicles to more easily check a situation where a vehicle is reversing or a door is opened.

The above information disclosed in this section is merely for enhancement of understanding of the background of the disclosure and therefore it may contain information that does not form the prior art that is already known in this country to a person of ordinary skill in the art.

SUMMARY

In view of the above, the present disclosure provides an automotive lamp that informs an ambient vehicle approaching from one side behind the vehicle of a vehicle state by irradiating light of a road pattern indicating the vehicle state to an area behind the vehicle. The present disclosure also provides an automotive lamp capable of preventing an accident by informing other vehicles of a vehicle state such as a reverse movement of a vehicle and opening of a door through a road pattern formed by light irradiated to an area behind the vehicle. The present disclosure also provides an automotive lamp capable of irradiating light of a road pattern indicating a vehicle state and light of a road pattern indicating a dangerous factor to an area behind the vehicle.

According to an aspect of the present disclosure the automotive lamp may include a lamp unit disposed in a rear lamp housing of a vehicle and a detection unit configured to detect whether a reverse shift stage is selected. The lamp unit may be configured to irradiate a first light distribution pattern that forms a reversing light signal pattern in the rearward direction of the vehicle, and a second light distribution pattern that forms a road pattern on the rearward road surface of the vehicle. The first light distribution pattern and the second light distribution pattern may be formed simultaneously, when the reverse shift stage is selected.

In an exemplary embodiment the lamp unit may include a plurality of light sources that each form individual road patterns. In some exemplary embodiments the lamp unit may include a reflector configured to reflect a light irradiated from a light source toward a rearward direction of the vehicle.

In another exemplary embodiment, the automotive lamp may include the light source disposed on the upper side of the reflector. The automotive lamp may include the light source disposed on the lower side of the reflector. In another exemplary embodiment, the reflector of the automotive lamp may include a first reflective surface that forms the first light distribution pattern, and a second reflective surface that forms the second light distribution pattern. In some exemplary embodiments, the first reflective surface and the second reflective surface may be coupled with the light source. In some exemplary embodiments, the automotive lamp may include the second light distribution pattern that forms a plurality of road patterns on the rearward road surface of the vehicle, and the light source that corresponds to the road surface pattern disposed a greater distance from the vehicle may have a greater luminance intensity. The first light distribution pattern may be configured to irradiate toward a first direction, and the second light distribution pattern is configured to irradiate toward a second direction.

In other exemplary embodiments, the automotive lamp may include the first light distribution pattern and the second light distribution pattern illuminated in separate areas from each other. Additionally, the automotive lamp may include the second light distribution pattern irradiated with a greater luminesce intensity than the first light distribution pattern. The automotive lamp may include the road patterns disposed parallel to the central line C of the vehicle. Further, the automotive lamp may include the road pattern formed in an acute angle from the central line C.

In some exemplary embodiments, the automotive lamp may include the shape of the road pattern that is a straight line. The automotive lamp may include a circular shape of the road pattern. The automotive lamp may include the interval of each of the plurality of road patterns that gradually increase as the distance from the vehicle increases. The automotive lamp may include the interval of each of the plurality of road patterns that are equal.

In other exemplary embodiments, the automotive lamp may include the road pattern having a rectangular shape. The automotive lamp may include the plurality of rectangular road patterns that are greater in width and height as the distance from the vehicle increases. The automotive lamp may include each of the plurality of rectangular road patterns having the same width, and the height may become greater as the distance from the vehicle increases.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
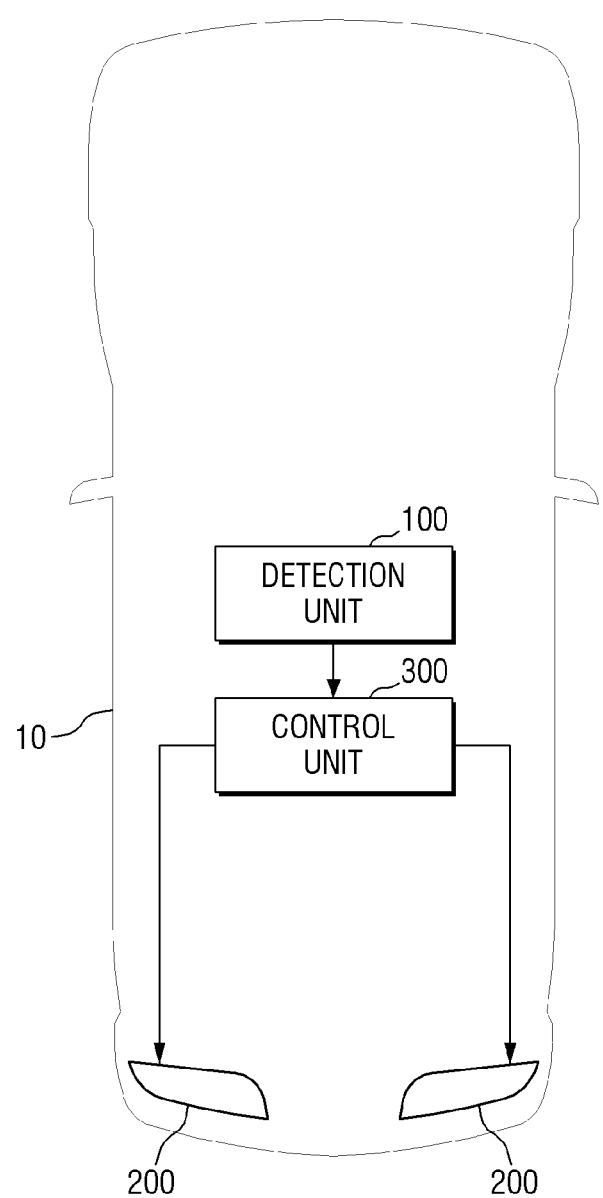
FIG. 1 schematically shows an automotive lamp in accordance with a first exemplary embodiment of the present disclosure.

Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Hereinafter, an automotive lamp in accordance with a first embodiment of the present disclosure will be described with reference to the accompanying drawings.

FIG. 1 schematically shows an automotive lamp in accordance with a first exemplary embodiment of the present disclosure. As shown in FIG. 1, the automotive lamp 1 in accordance with the first embodiment of the present disclosure may include a detection unit 100 which detects a state of a vehicle 10, lamp units 200 which are installed on the rear side of the vehicle 10 and irradiate light of a road pattern indicating a state of the vehicle 10 to inform an ambient vehicle approaching from one side behind the vehicle 10, and a control unit 300 which controls the road pattern according to the detection results of the detection unit 100.

The detection unit 100 may be configured to detect a vehicle state of the vehicle 10. In the first exemplary embodiment of the present disclosure, the vehicle state may include a reverse idle state (i.e., a state where the vehicle 10 is stopped, but a reverse shift stage is selected), a reverse state, a door open state and the like. However, it is merely one example to facilitate understanding of the present disclosure, and it is not limited thereto. The detection unit 100 may be configured to detect various states where a vehicle accident between the vehicle 10 and an ambient vehicle approaching from one side behind the vehicle 10 is likely to occur.

Further, in the first exemplary embodiment of the present disclosure, the reverse state may include a reverse movement due to selection of a reverse shift stage, a reverse movement due to an external factor and the like. The reverse movement due to an external factor may include a case where the vehicle 10 is pulled downward on an inclined road, and the like. Each of the lamp units 200 may be installed on one rear side of the vehicle 10 and irradiate light of a road pattern indicating the vehicle state according to the detection results of the detection unit 100. In the first exemplary embodiment of the present disclosure, the lamp unit 200 may be installed on both rear sides, respectively, of the vehicle 10 and irradiate light of a road pattern on the road behind the vehicle 10.

Figure 2:
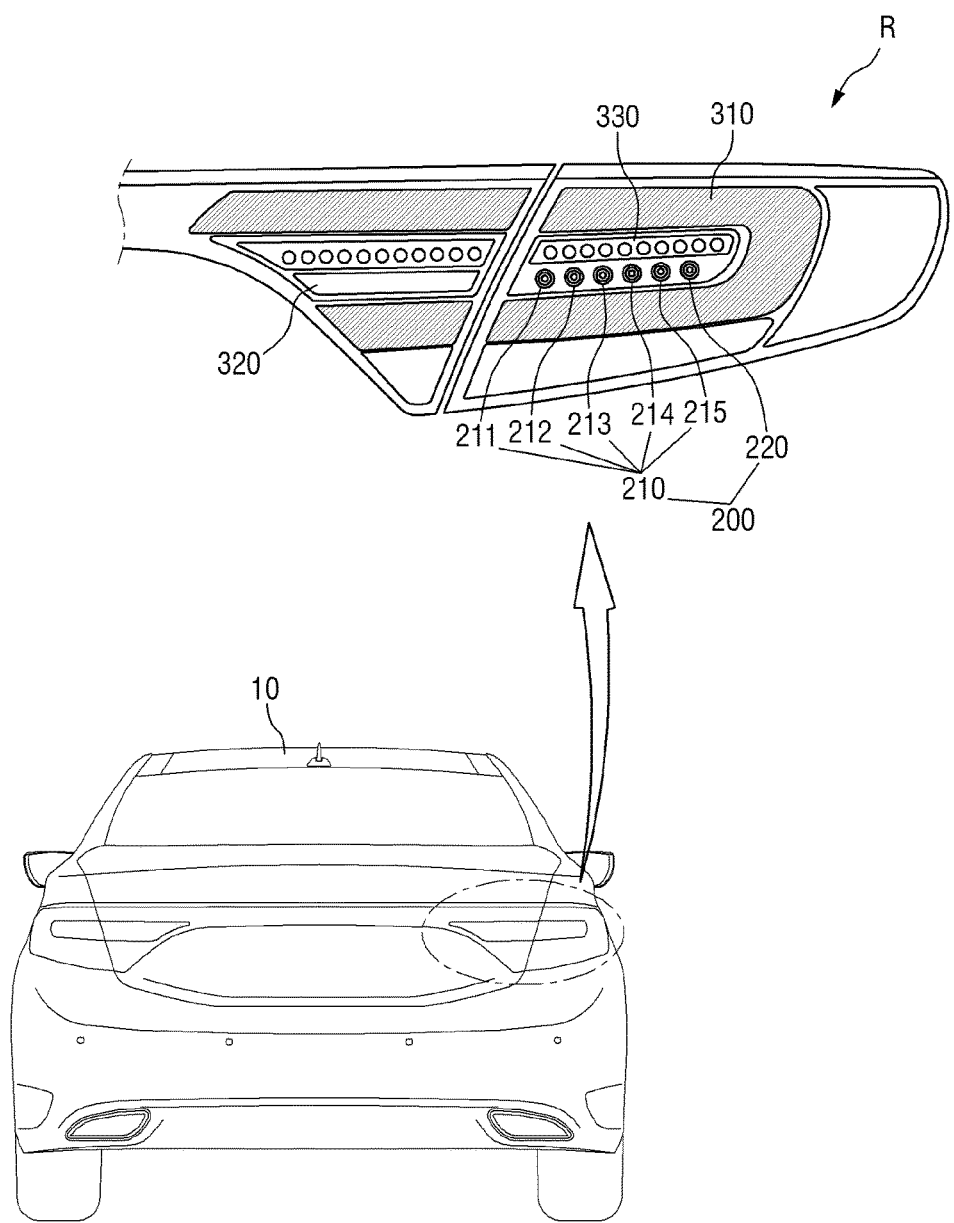
FIG. 2 schematically shows lamp units in accordance with the first exemplary embodiment of the present disclosure.

For example, as shown in FIG. 2, a rear lamp R including a brake lamp 310, a reversing lamp 320, a turn signal lamp 330 and the like may be installed on the rear side of the vehicle 10 in addition to the lamp units 200. FIG. 2 illustrates that the lamp units 200 and the reversing lamp 320 are located at different places. Particularly, FIG. 2 illustrates an example in which lamps having different functions are located at different places, but two or more lamps may be located at the same place if they can perform different functions even when located at the same place.

For example, the lamp units 200 may be located in the same space as the reversing lamp 320, or vice versa. When the lamp units 200 are located in the same space as the reversing lamp 320, the reversing lamp 320 may also perform the functions of the lamp units 200. For example, the lamp units 200 and the reversing lamp 320 may be located in different lamp housings to perform respective functions, but the present disclosure is not limited thereto. That is, alternatively, since the lamp units 200 and the reversing lamp 320 indicate a reverse movement of the vehicle 10 and are preferably located as close as possible to each other, the lamp units 200 and the reversing lamp 320 may be located in the same lamp housing or may be allowed to share the same lens. When the lamp units 200 and the reversing lamp 320 are located in the same lamp housing, either the lamp units 200 or the reversing lamp 320 may be omitted from the exterior of the rear lamp R of FIG. 2.

When the vehicle 10 is reversing, the reversing lamp 320 may be turned on to inform an ambient vehicle approaching behind the vehicle 10 of the reverse movement, thereby allowing a driver of the ambient vehicle to make preparations for the reverse movement of the vehicle 10. In this case, the ambient vehicle approaching behind the vehicle 10 may monitor the reversing lamp 320 of the vehicle 10 and make preparations. However, since an ambient vehicle approaching from a left or right side behind the vehicle 10 cannot easily monitor the reversing lamp 320 due to the presence of any large vehicle or obstacle nearby, a vehicle accident is highly likely to occur.

Accordingly, the lamp units 200 in accordance with the first exemplary embodiment of the present disclosure irradiate light of the road pattern indicating a reverse state of the vehicle 10 together with the reversing lamp 320 when the vehicle 10 is reversing, thereby allowing an ambient vehicle approaching behind the vehicle 10, and an ambient vehicle approaching from a left or right side behind the vehicle 10 to more easily monitor the reverse movement of the vehicle 10 through the road pattern and make preparations.

Each of the lamp units 200 in accordance with the first exemplary embodiment of the present disclosure may include a first lamp unit 210 and a second lamp unit 220. The first lamp unit 210 may include a plurality of light source parts 211 to 215. By adjusting the size, installation angle and focal length of each of the light source parts 211 to 215, a desired road pattern in an area behind the vehicle 10 may be formed. In this case, although the first lamp unit 210 includes five light source parts 211 to 215 in the first exemplary embodiment of the present disclosure, the number of light sources included in the first lamp unit 210 may be adjusted according to the purpose and need.

Figure 3:
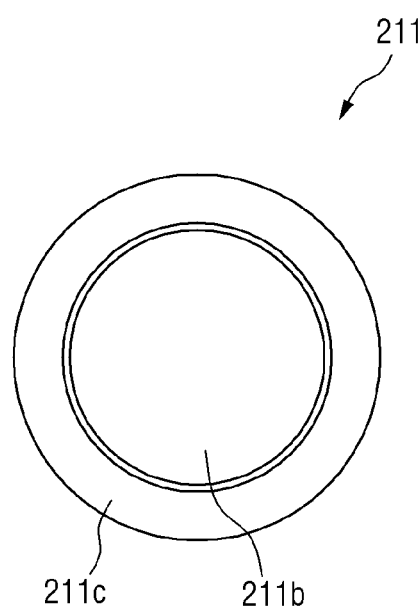
FIG. 3 is a front view of a light source part of a first lamp unit in accordance with the first exemplary embodiment of the present disclosure.
Figure 4:
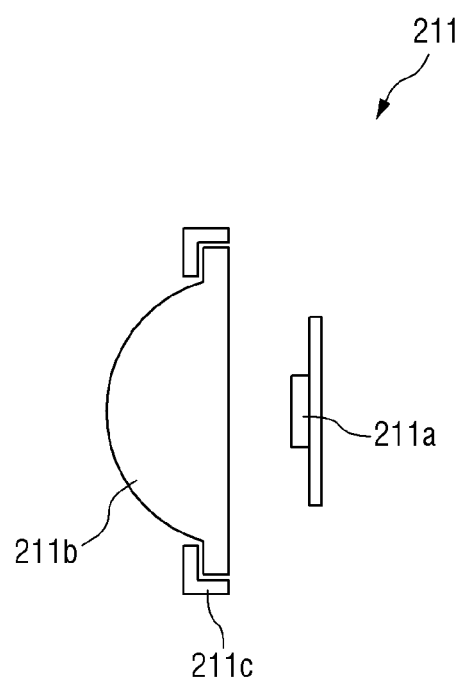
FIG. 4 is a side view of the light source part of the first lamp unit in accordance with the first exemplary embodiment of the present disclosure.

FIG. 3 is a front view of a light source part of the first lamp unit in accordance with the first exemplary embodiment of the present disclosure. FIG. 4 is a side view of the light source part of the first lamp unit in accordance with the first exemplary embodiment of the present disclosure. In particular, although one light source part 211 among the light source parts 211 to 215 included in the first lamp unit 210 is illustrated in FIGS. 3 and 4, the other light source parts 212 to 215 may have a similar structure as that of the light source part 211, and there may be a difference in the size, installation angle, focal distance and the like.

Figure 5:
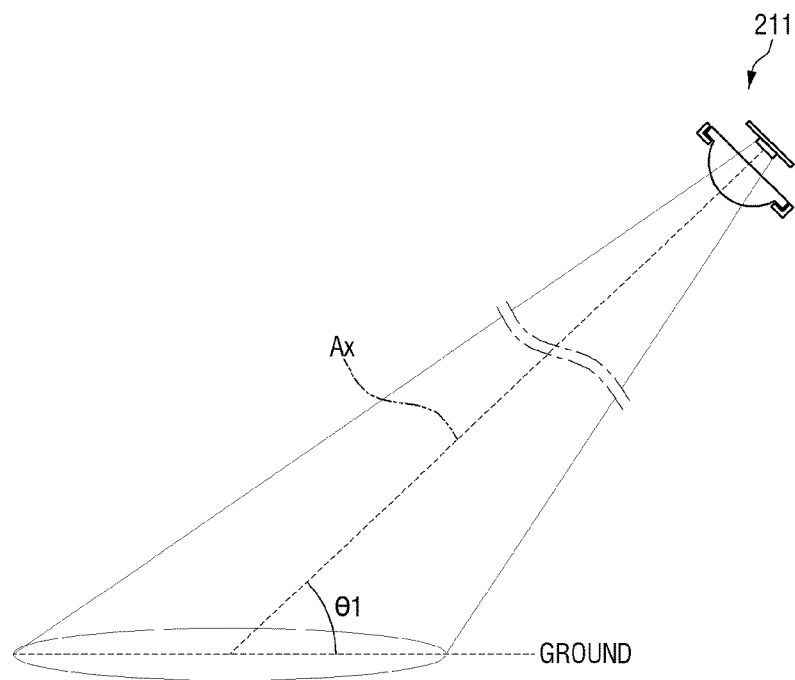
FIGS. 5 and 6 schematically show an installation angle of the light source part of the first lamp unit in accordance with the first exemplary embodiment of the present disclosure.
Figure 6:
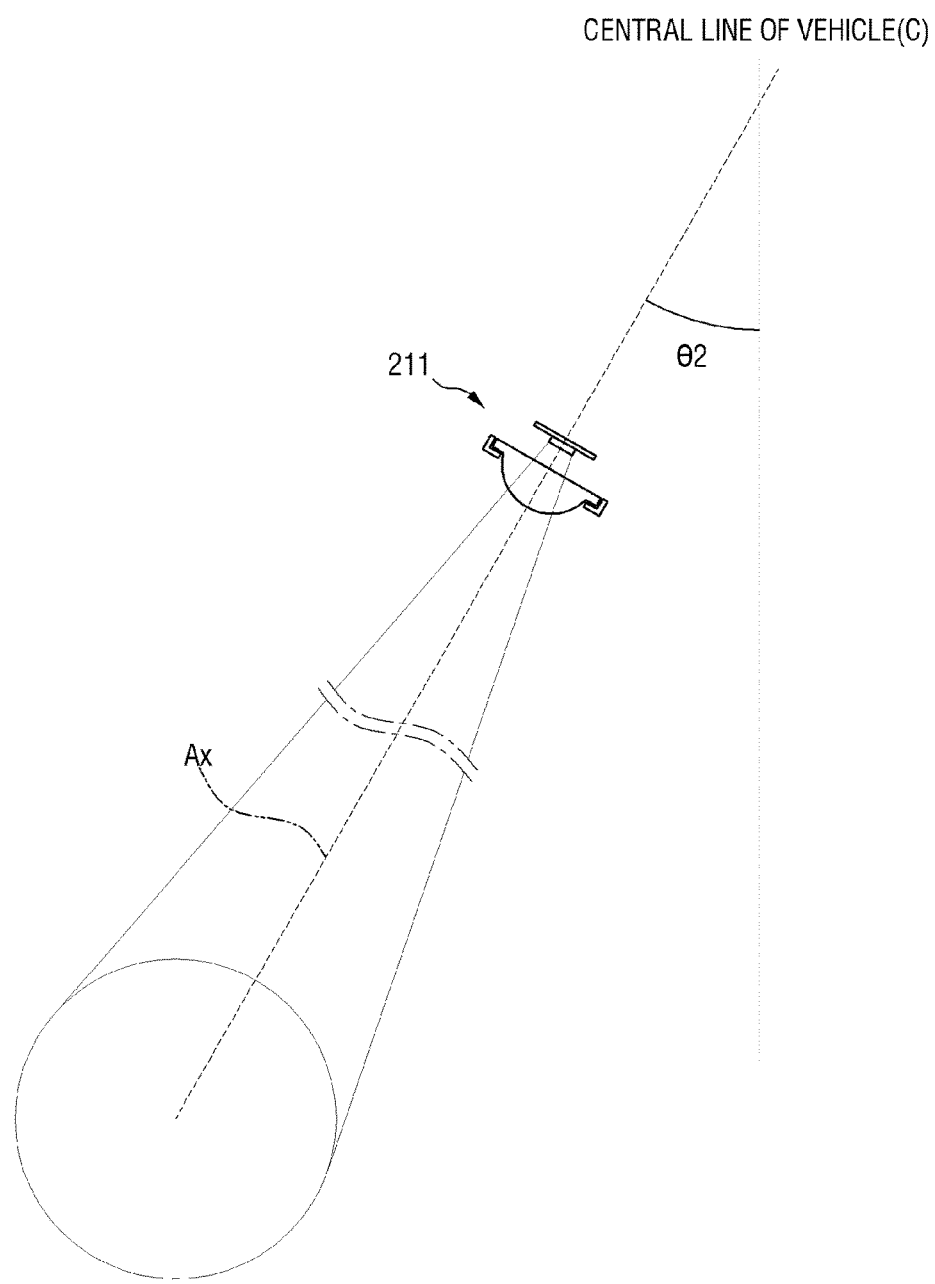

Referring to FIGS. 3 and 4, the light source part 211 may include a light source 211*a*, a lens 211*b*, and a housing 211*c* in which the lens 211*b* is installed. A light emitting diode may be used as the light source 211*a*, but it is not limited thereto. Further, a manufacturer name and the like may be represented on one surface of the housing 211*c* surrounding the lens 211*b*. The light source part 211 included in the first lamp unit 210 in accordance with the first exemplary embodiment of the present disclosure is installed, as illustrated in FIGS. 5 and 6, so as for its optical axis Ax to be inclined by about $\theta 1$ from the ground in a top-to-bottom direction and to be inclined by about $\theta 2$ from a central line C of the vehicle in a left-to-right direction such that a desired road pattern can be formed in the rear of the vehicle 10. In this case, in FIGS. 5 and 6, $\theta 1$ and $\theta 2$ may vary based on the road pattern formed by the first lamp unit 210.

Figure 7:
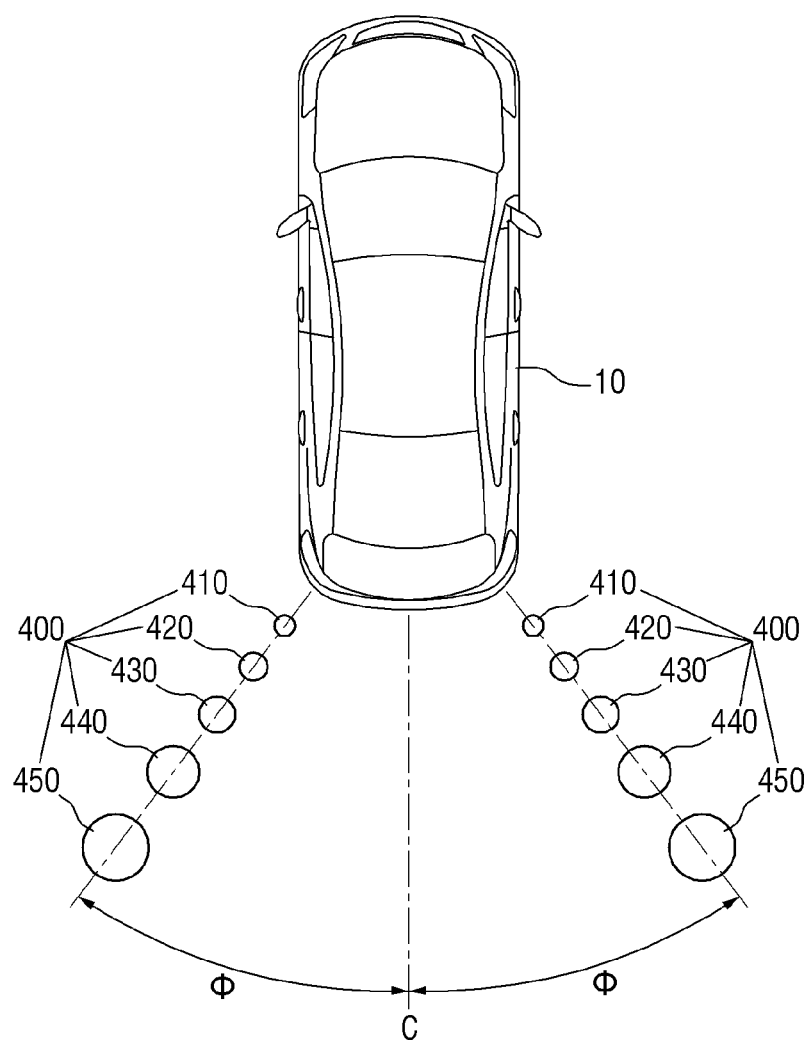
FIG. 7 schematically shows road patterns formed by the first lamp unit in accordance with the first exemplary embodiment of the present disclosure.

FIG. 7 schematically shows road patterns formed by the first lamp unit in accordance with the first exemplary embodiment of the present disclosure. Referring to FIG. 7, road patterns 400 formed by light irradiated from the first lamp unit 210 may be formed such that a plurality of shapes 410, 420, 430, 440, and 450 are arranged in one direction by adjusting the size, installation angle, irradiation direction and the like of the light source parts 211 to 215 included in the first lamp unit 210. For example, in the first exemplary embodiment of the present disclosure, the shapes 410, 420, 430, 440, and 450 are formed by the light source parts 211, 212, 213, 214, and 215, respectively, but the present disclosure is not limited thereto. That is, alternatively, at least two of the light source parts 211 to 215 may form one of the shapes 410, 420, 430, 440, and 450.

In this case, the size, interval, form, and the like of the shapes 410, 420, 430, 440, and 450 included in the road patterns 400 may vary according to the purpose and need. In the first exemplary embodiment of the present disclosure, the shapes 410, 420, 430, 440, and 450 included in the road patterns 400 are circular shapes and have sizes gradually increasing as the distance from the vehicle 10 increases. However, it is merely one example to facilitate understanding of the present disclosure, and it is not limited thereto. The shapes 410, 420, 430, 440, and 450 may have various shapes such as a rectangular shape and may have uniform sizes or sizes gradually decreasing as the distance from the vehicle 10 increases. The distances between the shapes 410,

420, 430, 440, and 450 may differ from one another or may be identical depending on the sizes, the installation angles, and the focal distances of the light source parts 211 to 215.

In this case, as shown in FIG. 7 the road patterns 400 may be formed at both sides, each having a predetermined angle Φ from the central line C of the vehicle 10. The angle Φ between the central line C of the vehicle 10 and each of the road patterns 400 may be set in consideration of the visibility of the road patterns 400 to an ambient vehicle approaching from one side behind the vehicle 10, may be set through various tests by a manufacturer or the like, or may be a certain angle set by the driver, without being limited thereto. Further, the road patterns 400 are formed on both rear sides of the vehicle 10 in the example of FIG. 7, but it is not limited thereto. The road pattern may be formed on one rear side of the vehicle 10 according to the reversing direction of the vehicle 10.

Meanwhile, the light source parts 211 to 215 included in the first lamp unit 210 of FIG. 2 may be arranged in a row in a horizontal direction, and each of the road patterns 400 of FIG. 7 may be formed to have the predetermined angle Φ from the central line C of the vehicle 10. In the first exemplary embodiment of the present disclosure, as shown in FIGS. 5 and 6, a desired road pattern may be formed by adjusting the installation angles and the installation locations of the light source parts 211 to 215 included in the first lamp unit 210.

Further, the light source parts 211 to 215 of FIG. 2 may be arranged in a row in the horizontal direction. However, it is merely one example to facilitate understanding of the present disclosure, and it is not limited thereto. The light source parts 211 to 215 may be arranged in various directions according to the layout of the lamp. When the arrangement direction of the light source parts 211 to 215 is changed to form the road patterns 400 of FIG. 7, the installation angle or the like may be also changed.

Referring again to FIG. 2, the second lamp unit 220 may be installed at one side of the first lamp unit 210 to inform an ambient vehicle approaching from one side behind the vehicle 10 of the vehicle state by irradiating light of a road pattern such as characters and shapes in cooperation with the first lamp unit 210. For example, the first lamp unit 210 may irradiate light of a road pattern in which specific shapes are arranged, and the second lamp unit 220 may irradiate light of a road pattern such as characters and shapes providing warning to prevent occurrence of a vehicle accident. When the vehicle 10 includes a separate device (e.g., warning light) serving as the second lamp unit 220, the second lamp unit 220 may be omitted, and the second lamp unit 220 may operate independently of the first lamp unit 210.

Figure 8:
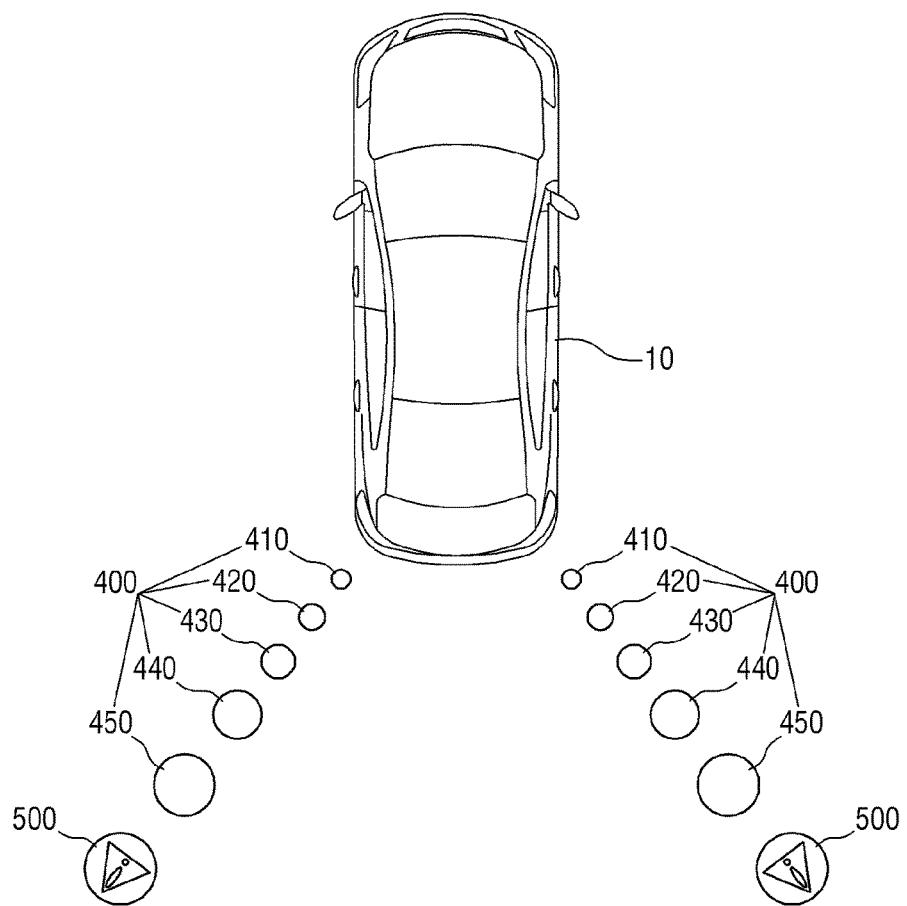
FIG. 8 schematically shows road patterns formed by the first lamp unit and the second lamp unit in accordance with the first exemplary embodiment of the present disclosure.

FIG. 8 schematically shows road patterns formed by the first lamp unit and the second lamp unit in accordance with the first exemplary embodiment of the present disclosure. Referring to FIG. 8, it can be seen that each of road patterns 400 formed by the first lamp unit 210 may be formed in one direction from the rear side of the vehicle 10, and each of road patterns 500 formed by the second lamp unit 220 may be formed at one side of each of the road patterns 400 formed by the first lamp unit 210 and has a shape to provide warning to an ambient vehicle. The shape of the road patterns 500 formed by the lamp units 200 may be selected by the driver to have various shapes according to the situation through a switch or the like installed in the vehicle 10.

Figure 9:
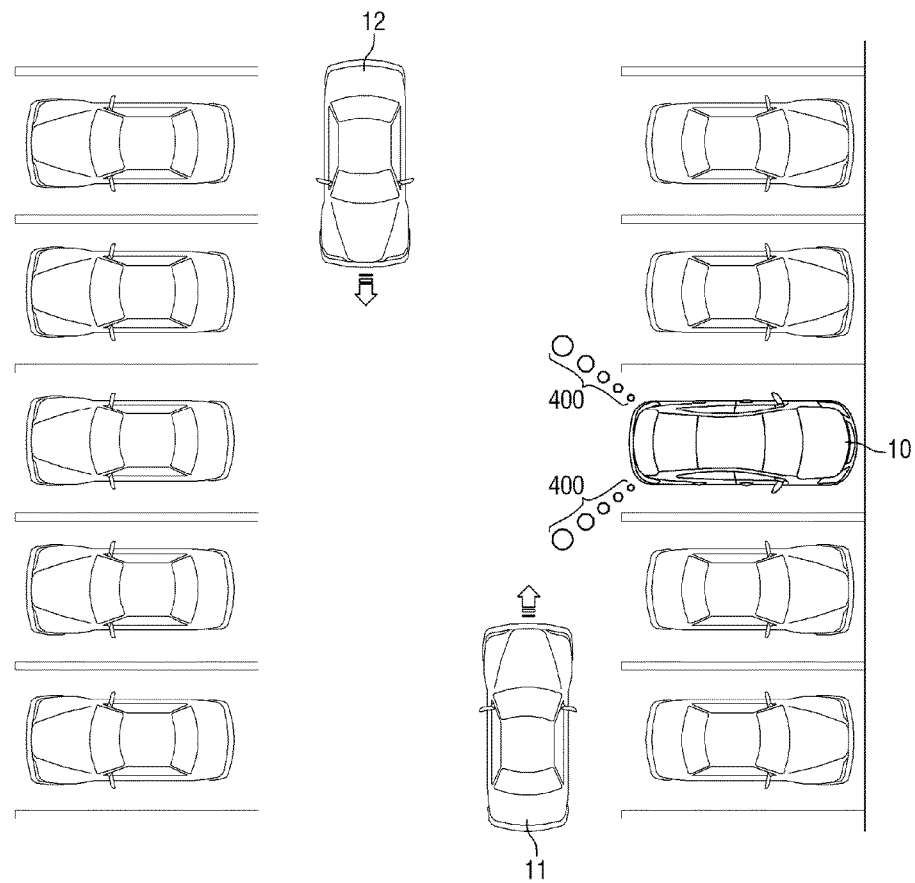
FIGS. 9 and 10 schematically show road patterns in a reverse movement of a vehicle in accordance with the first exemplary embodiment of the present disclosure.
Figure 10:
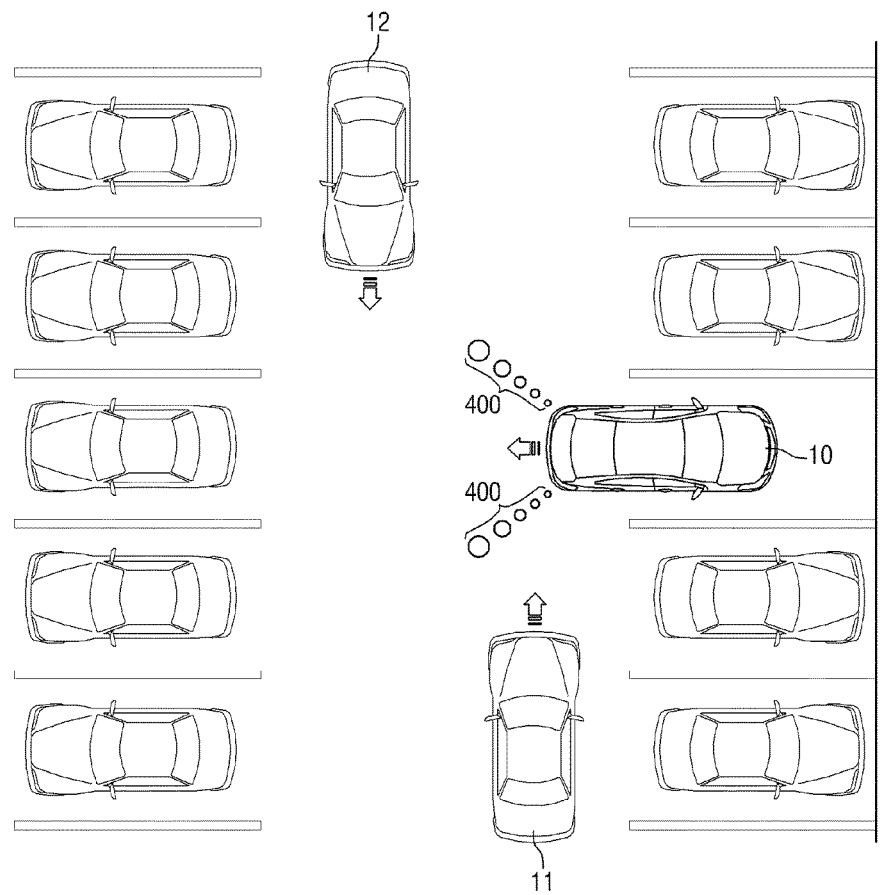

The control unit 300 may form the road patterns 500 by controlling the lamp units 200 according to the detection results of the detection unit 100. For example, in a case where the vehicle 10 is stopped although the detection unit 100 detects that the driver selects a shift stage for reverse movement of the vehicle 10, the control unit 300 may control such that the road patterns 400 formed by the first lamp unit 210 are turned on and off. In a case where the vehicle 10 begins to move in a backward direction, the control unit 300 may control such that the road patterns 400 maintain an ON state. That is, the control unit 300 may control such that the road patterns 400 are turned on and off when the vehicle 10 is stopped although the driver selects a shift stage for reverse movement of the vehicle 10 as illustrated in FIG. 9, and the road patterns 400 maintain an ON state while the vehicle 10 is reversing as illustrated in FIG. 10. In this case, turning on and off the road patterns 400 as illustrated in FIG. 9 and maintaining an ON state of the road patterns 400 as illustrated in FIG. 10 allow a driver of the ambient vehicle to distinguish the situations by forming different road patterns according to the situation, but it is not limited thereto. In FIGS. 9 and 10, all road patterns may maintain an ON state or OFF state.

FIGS. 9 and 10 illustrate a case where the road patterns 400 are formed when the vehicle 10 is reversing, and in this case, it may be understood that the reversing lamp 320 is also turned on. For example, in the first exemplary embodiment of the present disclosure, in response to a selection of the shift stage for the reverse movement of the vehicle 10 being detected by the detection unit 100, the control unit 300 may control the road patterns 400 to be formed, but the present disclosure is not limited thereto. That is, alternatively, the control unit 300 may detect the turning on of the reversing lamp 320 and may then control the road patterns 400 to be formed.

Accordingly, ambient vehicles 11 and 12 approaching behind the vehicle 10 may be informed previously of the reverse movement and make preparations when the road patterns 400 are turned on and off, and may take an appropriate action when the vehicle 10 begins to move backward.

Figure 11:
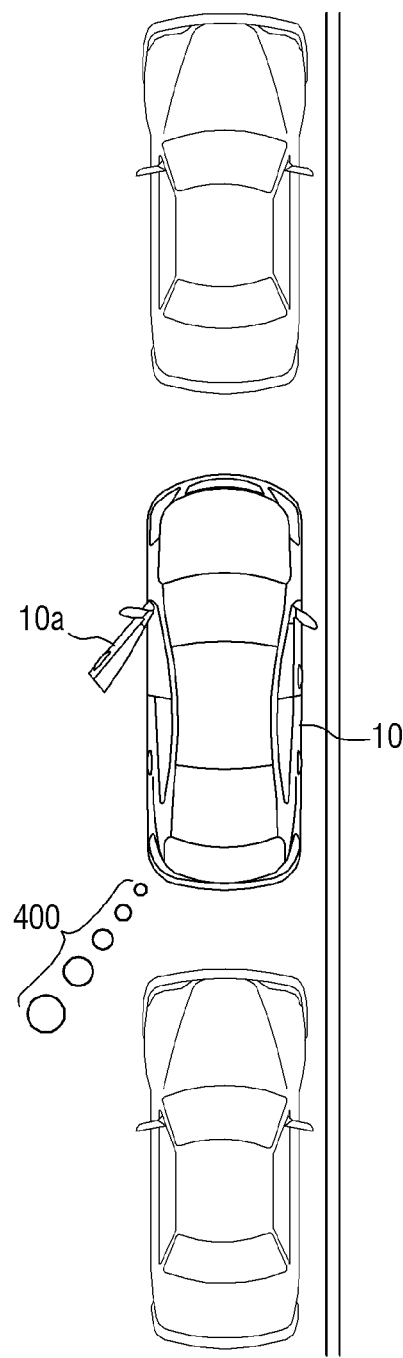
FIGS. 11 and 14 schematically show road patterns when a door is open in accordance with the first exemplary embodiment of the present disclosure.
Figure 12:
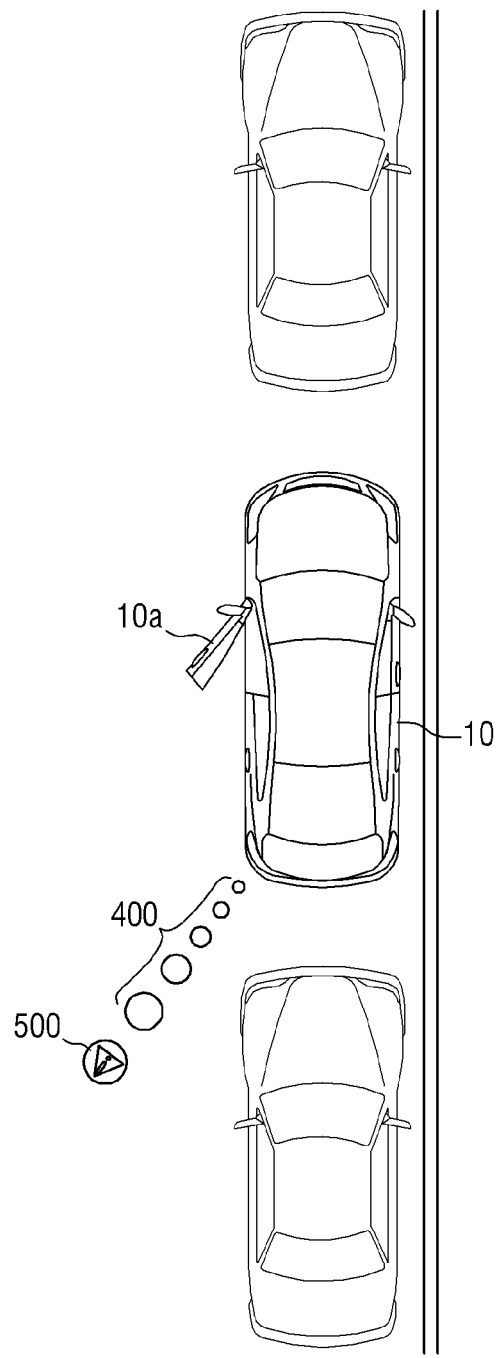

Further, in order to prevent a vehicle accident that may occur due to an ambient vehicle approaching from one side behind the vehicle 10 when a driver opens a door and exits the vehicle as well as when the vehicle 10 is reversing, i.e., for the safety of the driver who exits the vehicle 10 when the door of the vehicle 10 is open in a parking or stopping state of the vehicle 10, the control unit 300 may control the first lamp unit 210 to form the road patterns 400. Also in this case, the road patterns 400 may maintain an ON or OFF state. Further, the control unit 300 may additionally turn on the second lamp unit 220 when the driver exits the vehicle 10, thereby preventing death and injury. That is, in a case where a door 10a is open when the vehicle 10 is parked or stopped at one side of the road as illustrated in FIG. 11, the control unit 300 may control such that the road pattern 400 is formed by the first lamp unit 210 provided on the road side. Similarly, as illustrated in FIG. 12, the road pattern 500 formed by the second lamp unit 220 in addition to the road pattern 400 formed by the first lamp unit 210 may be additionally formed.

Figure 13:
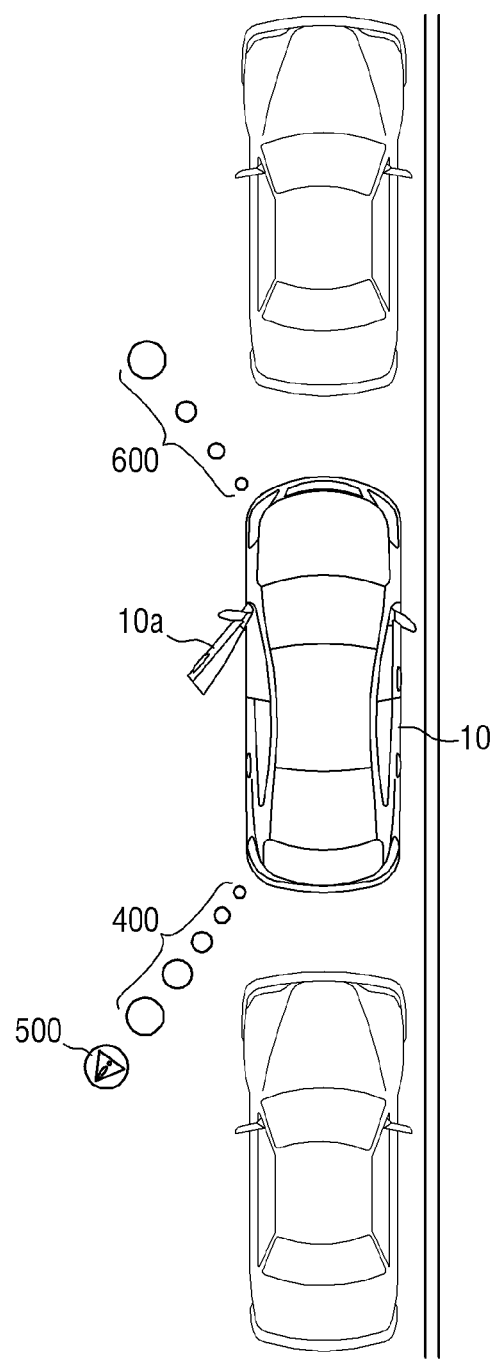

Further, in case of the road such as an alley having a narrow width, as illustrated in FIG. 13, a road pattern 600 similar to the road pattern formed by the first lamp unit 210 may be also formed in front of the vehicle 10 as well as in the rear of the vehicle 10. This is because the vehicle accident may occur due to a vehicle approaching in front of the vehicle as well as a vehicle approaching behind of the vehicle 10 when the width of the road is narrow. For this, in the first exemplary embodiment of the present disclosure, the first lamp unit 210 may be installed on one front side of the vehicle 10 in addition to one rear side of the vehicle 10. Also in the case where the first lamp unit 210 is installed on the front side of the vehicle 10, the road pattern 600 may be formed such that the specific shapes are arranged at a predetermined angle from the central line C of the vehicle 10 similarly to the case where the first lamp unit 210 is installed on the rear side of the vehicle 10. According to the situation, the first lamp unit 210 and the second lamp unit 220 may be installed on one front side of the vehicle 10.

Figure 14:
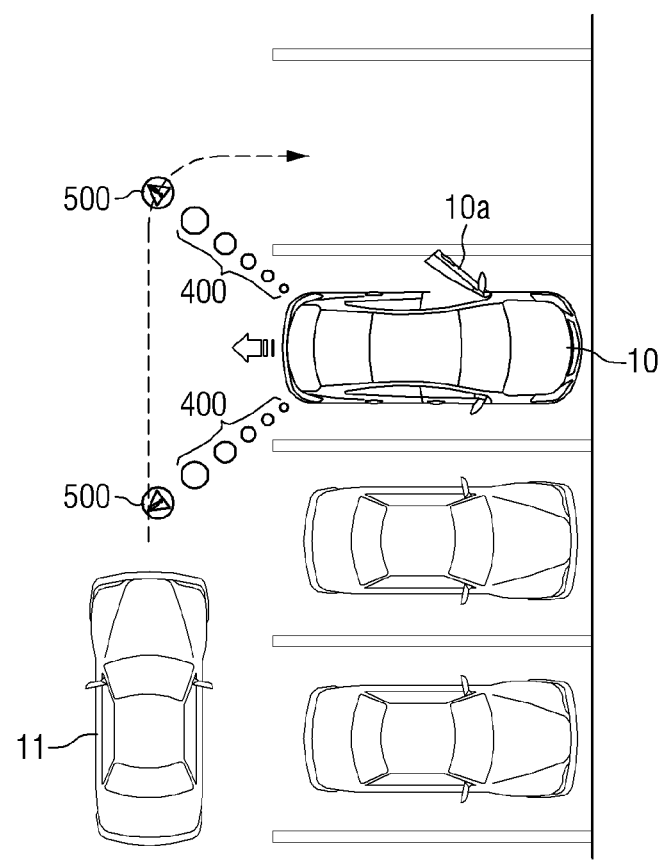

Meanwhile, also in a case where the vehicle 10 is parked in the parking lot instead of one side of the road, as illustrated in FIG. 14, the road patterns 400 and 500 may be formed by the first lamp unit 210 and the second lamp unit 220, thereby preventing a vehicle accident from occurring due to the ambient vehicle 11 when the driver opens the door 10*a* and exits the vehicle 10. Also in the case of FIG. 14, all of the road patterns 400 and 500 are formed by the first lamp unit 210 and the second lamp unit 220. However, it is merely one example to facilitate understanding of the present disclosure, and it is not limited thereto. That is, only the road patterns 400 or the road patterns 500 may be formed.

Figure 15:
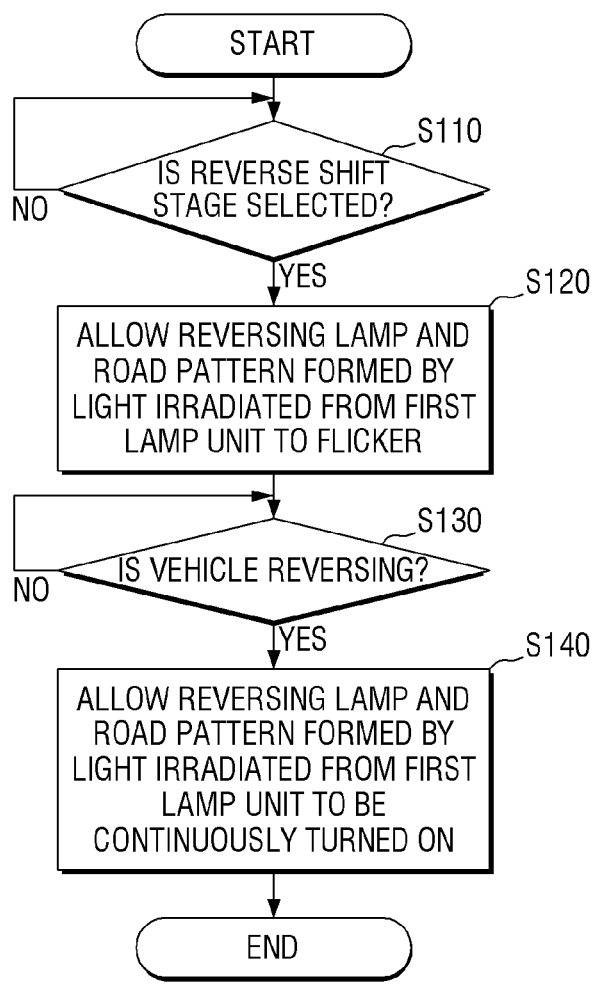
FIG. 15 is a flowchart showing a method for controlling a road pattern in a reverse movement of a vehicle in accordance with the first exemplary embodiment of the present disclosure.

FIG. 15 is a flowchart showing a method for controlling a road pattern in a reverse movement of a vehicle in accordance with the first exemplary embodiment of the present disclosure. Referring to FIG. 15, in the method for controlling a road pattern in a reverse movement of the vehicle 10, first, the detection unit 100 may be configured to detect whether a reverse shift stage for the reverse movement of the vehicle 10 is selected (step S110). When the reverse shift stage is selected and the vehicle 10 is stopped, the control unit 300 may be configured to control the first lamp unit 210 such that each of the road patterns 400 are formed in one direction behind the vehicle 10 (step S120). In this case, the road patterns 400 formed at step S120 may be turned on and off at predetermined intervals.

When the reverse movement of the vehicle 10 is detected (step S130), the control unit 300 is configured to adjust that the road patterns 400 formed by the first lamp unit 210 to maintain an ON state (step S140). In this case, the road patterns 500 are not formed by the second lamp unit 220 in FIG. 15, but it is not limited thereto. In steps S120 and S140 of FIG. 14, the road patterns 500 formed by the second lamp unit 220 may be formed in addition to the road patterns 400 formed by the first lamp unit 210.

Meanwhile, the case where the vehicle is reversing by selecting the reverse shift stage has been illustrated in FIG. 15, but it is not limited thereto, and it may be also applied to a case where the vehicle is reversing due to an external factor (e.g., inclined road). The reverse movement due to an external factor may include both a case where the reverse shift stage is selected and a case where the reverse shift stage is not selected. In the reverse movement due to an external factor when the reverse shift stage is not selected, steps S110 and S120 may be omitted.

Figure 16:
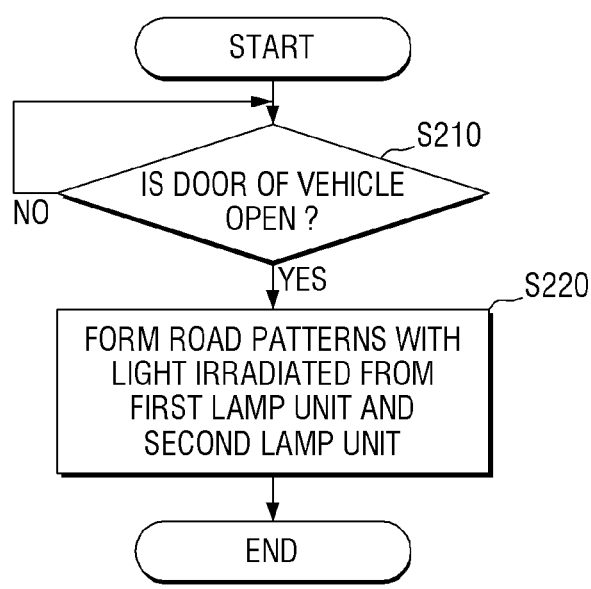
FIG. 16 is a flowchart showing a method for controlling a road pattern when a door is open in accordance with the first exemplary embodiment of the present disclosure.

FIG. 16 is a flowchart showing a method for controlling a road pattern when a door is open in accordance with the first exemplary embodiment of the present disclosure. FIG. 16 shows an example of the method for controlling a road pattern when a door is open while the vehicle 10 is parked or stopped on one side of the road or in the parking lot. Referring to FIG. 16, in the method for controlling a road pattern when a door is open in accordance with the first exemplary embodiment of the present disclosure, first, the detection unit 100 detects whether the door 10*a* of the vehicle 10 is opened (step S210).

When it is detected that the door 10*a* of the vehicle 10 is opened, the control unit 300 controls the first lamp unit 210 and the second lamp unit 220 to form the road patterns 400 and 500 (step S220). In this case, the case where all of the road patterns 400 and 500 are formed by the first lamp unit 210 and the second lamp unit 220 when the door 10*a* is open has been described in FIG. 16. However, the road patterns may be formed by only one of the first lamp unit 210 and the second lamp unit 220, and the road patterns may be formed by installing the first lamp unit 210 or the second lamp unit 220 on the front side of the vehicle 10 as well as the rear side of the vehicle 10.

As described above, in the automotive lamp in accordance with the first exemplary embodiment of the present disclosure, in a situation where the vehicle 10 is reversing or the door is open when an ambient vehicle is approaching from one side behind the vehicle 10, light of a road pattern indicating the reverse movement of the vehicle or opening of the door is irradiated to an area behind the vehicle to prevent a vehicle accident that may occur when a driver of an ambient vehicle does not recognize the situation. Accordingly, although the driver of the ambient vehicle does not check a reversing lamp or opening of the door, the driver of the ambient vehicle can recognize the possibility of occurrence of a vehicle accident through the road pattern and make preparations.

For example, in the first exemplary embodiment of the present disclosure, the lamp units 200 may irradiate light of the road patterns 400 together with the reversing lamp 320 when the vehicle 10 is reversing, and as a result, an ambient vehicle approaching from one side behind the vehicle 10 can easily recognize, and make preparations for, the reverse movement of the vehicle 10. However, the present disclosure is not limited to this example. That is, alternatively, the lamp units 200 may form first beam patterns, which indicate the reverse movement of the vehicle 10, and second beam patterns, which are road patterns formed on the road behind the vehicle 10, at the same time, in which case, the reversing lamp 320 may be omitted or may be installed in the same space as the lamp units 200.

Figure 17:
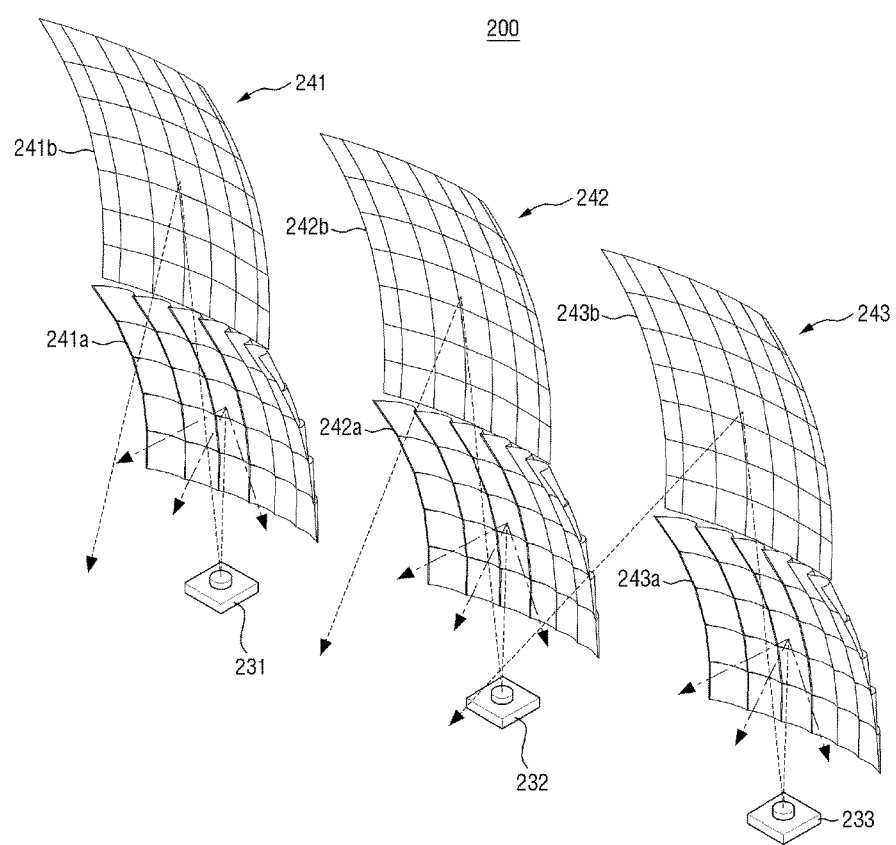
FIG. 17 is a perspective view of a lamp unit in accordance with a second exemplary embodiment of the present disclosure.
Figure 18:
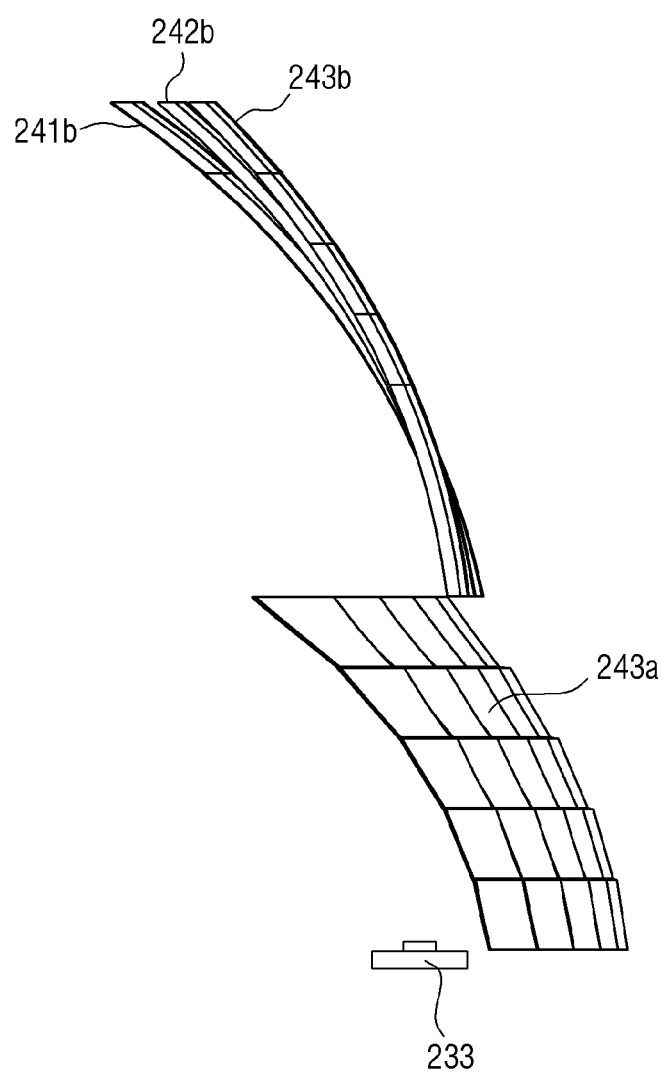
FIG. 18 is a side view of the lamp unit in accordance with the second exemplary embodiment of the present disclosure.

FIG. 17 is a perspective view of a lamp unit in accordance with a second embodiment of the present disclosure, and FIG. 18 is a side view of the lamp unit in accordance with the second exemplary embodiment of the present disclosure. Referring to FIGS. 17 and 18, a lamp unit 200 in accordance with the second exemplary embodiment of the present disclosure may include a plurality of light source parts 231, 232, and 233 and a plurality of reflectors 241, 242, and 243, which reflect light generated by the plurality of light source parts 231, 232, and 233 toward the rear of a vehicle 10. In the description that follows, the plurality of light source parts 231, 232, and 233 may be referred to as the first, second, and third light source parts 231, 232, and 233, respectively, and the plurality of reflectors 241, 242, and 243 may be referred to as the first, second, and third reflectors 241, 242, and 243, respectively. However, it is obvious that the number of light source parts and the number of reflectors may vary.

For example, in the second exemplary embodiment of the present disclosure, the plurality of reflectors 241, 242, and 243 may be paired with the plurality of light source parts 231, 232, and 233, respectively, to reflect light generated by the plurality of light source parts 231, 232, and 233, but the present disclosure is not limited thereto. That is, in an alternative example, at least two of the plurality of reflectors 241, 242, and 243 may reflect light generated by the same light source part toward the rear of the vehicle 10, or light generated by at least two of the plurality of light source parts 231, 232, and 233 may be reflected toward the rear of the vehicle 10 by the same reflector. In this alternative example, the number of light source parts and the number of reflectors may differ from each other.

The plurality of light source parts 231, 232, and 233 may be arranged in a row in a horizontal direction and may be installed on the same substrate or on different substrates. For example, in the second exemplary embodiment of the present disclosure, the plurality of light source parts 231, 232, and 233 may be located below the plurality of reflectors 241, 242, and 243 and may emit light upwardly, but the present disclosure is not limited thereto. That is, alternatively, the plurality of light source parts 231, 232, and 233 may be located above the plurality of reflectors 241, 242, and 243 and may emit light downwardly.

The plurality of reflectors 241, 242, and 243 may include reflective surfaces 241a, 242a, and 243a, respectively, which form a first beam pattern, and reflective surfaces 241b, 242b, and 243b, respectively, which are disposed above the reflective surfaces 241a, 242a, and 243a, respectively, to form a second beam pattern. The reflective surfaces 241a, 242a, and 243a, which form a first beam pattern, may be formed in an integral body with the reflective surfaces 241b, 242b, and 243b, respectively, which form a second beam pattern, through injection molding, or may be formed separately from the reflective surfaces 241b, 242b, and 243b, respectively.

In the first reflector 241, a first portion of light generated by the first light source part 231 may be reflected toward the rear of the vehicle 10 by the reflective surface 241a, which forms a first beam pattern, and a second portion of other light generated by the first light source part 231 may be reflected toward the rear of the vehicle 10 by the reflective surface 241b, which forms a second beam pattern. In the second or third reflector 242 or 243, like in the first reflector 241, a portion light generated by the second or third light source part 232 or 233 may be reflected toward the rear of the vehicle 10 by the reflective surface 242a or 243a, which forms a first beam pattern, and some portion of light generated by the second or third light source part 232 or 233 may be reflected toward the rear of the vehicle 10 by the reflective surface 242b or 243b, which forms a second beam pattern.

FIGS. 17 and 18 illustrate an example in which the plurality of light sources 231, 232, and 233 are located below the plurality of reflectors 241, 242, and 243. In a case where the plurality of light source parts 231, 232, and 233 are located above the plurality of reflectors 241, 242, and 243, the installation angles and the curvatures of the reflective surfaces included in each of the plurality of reflectors 241, 242, and 243 may be changed such that light can be reflected toward the rear of the vehicle 10.

Figure 19:
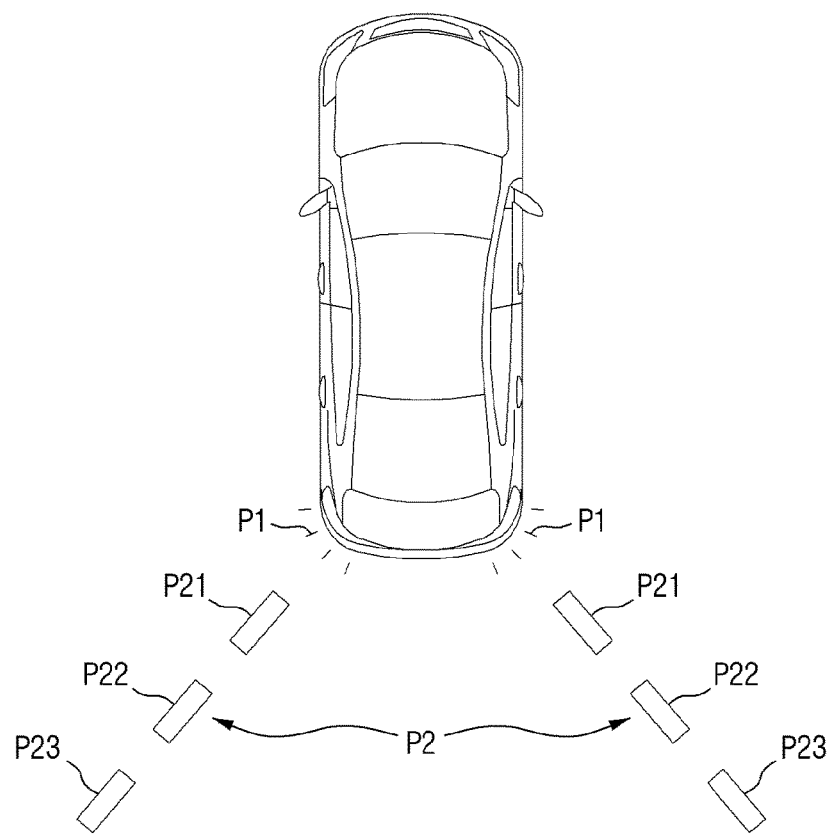
FIG. 19 schematically shows beam patterns formed by the lamp unit in accordance with the second exemplary embodiment of the present disclosure.

Referring to FIG. 19, the first, second, and third reflectors 241, 242, and 243 may form a first beam pattern P1, which indicates the reverse movement of the vehicle 10, and a second beam pattern P2, which is a road pattern formed on the road behind the vehicle 10, and the second beam pattern P2 may include a plurality of pattern areas P21, P22, and P23. It may be understood that the second beam pattern P2 and the plurality of pattern areas P21, P22, and P23 slightly differ in form and quantity from, but perform the same functions as, their respective counterparts in accordance with the first exemplary embodiment of the present disclosure, i.e., the road patterns 400 and the shapes 410, 420, 430, 440, and 450 of each of the road patterns 400.

In the second exemplary embodiment of the present disclosure, the first reflector 241 may form the pattern area P21, which is the closest pattern area to the vehicle 10, and the third reflector 243 may form the pattern area P23, which is the most distant pattern area from the vehicle 10, and a light source corresponding with a pattern area distant from the vehicle 10 may have a greater light intensity than a light source corresponding with a pattern area less distant from the vehicle 10 so that the pattern areas P21, P22, and P23 can all have uniform brightness.

For example, the third light source part 233 may have a greater light intensity than the second light source part 232, and the second light source part 232 may have a greater light intensity than the first light source part 231. For example, in the second embodiment of the present disclosure, the first, second, and third light source parts 231, 232, and 233 may have different light intensities so that the pattern areas P21, P22, and P23 can all have uniform brightness, but the present disclosure is not limited thereto. That is, alternatively, by controlling the size of the reflective surfaces of each of the reflectors 241, 242, and 243, the pattern areas P21, P22, and P23 may be allowed to have uniform brightness.

The reflective surfaces 241a, 242a, and 243a, which form the first beam pattern P1, may reflect light in a different direction from the reflective surfaces 241b, 242b, and 243b, which form the second beam pattern P2. In other words, in a case where light of the first beam pattern P1 is irradiated in a first direction, light of the second beam pattern P2 may be irradiated in a second direction, which is different from the first direction, in order to prevent the light of the first beam pattern P1 and the light of the second beam pattern P2 from interfering with each other.

Figure 20:
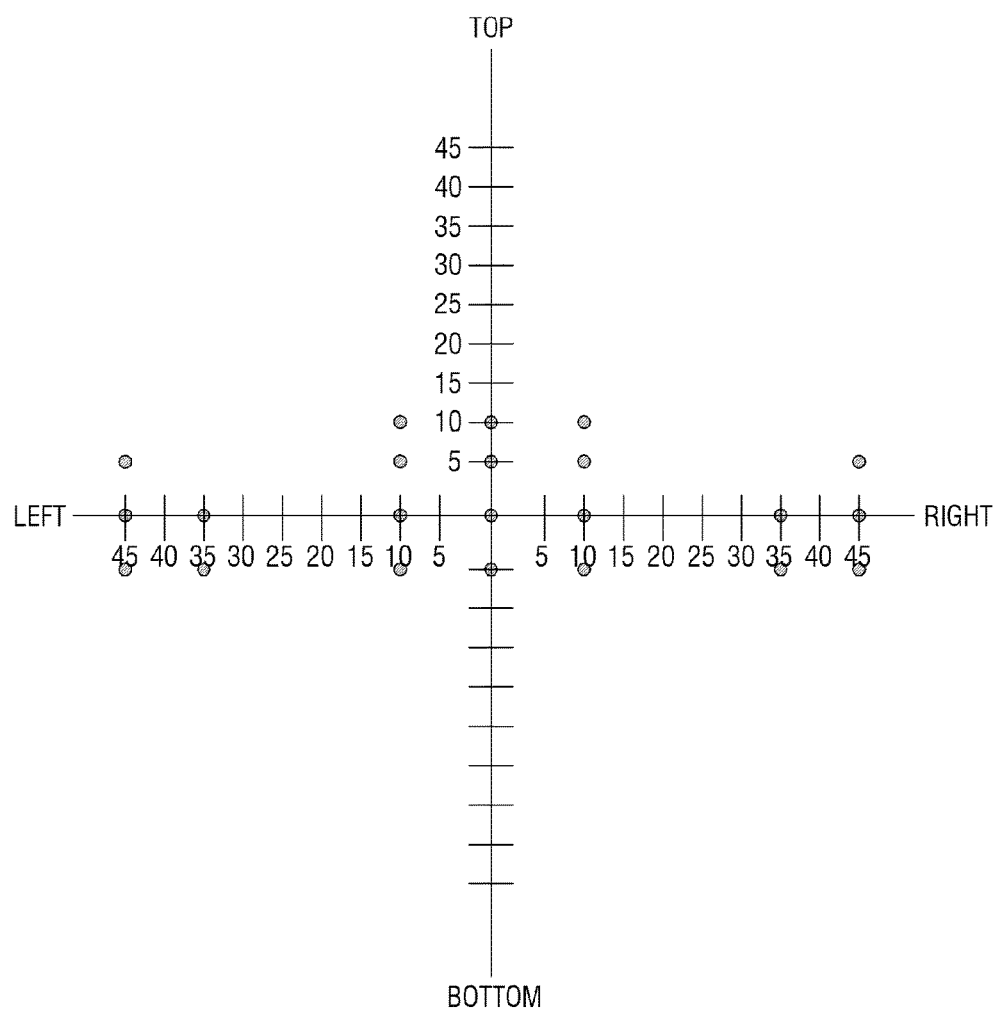
FIG. 20 schematically shows a light irradiation region of the lamp unit in accordance with the second exemplary embodiment of the present disclosure.

For example, in the second exemplary embodiment of the present disclosure, the light of the second beam pattern P2 may be irradiated in a more downward direction than the light of the first beam pattern P1 in order to form the second beam pattern P2 on the road behind the vehicle 10 as a road pattern. Specifically, referring to FIG. 20, since the light of the first beam pattern P1 is irradiated to an area of about 10 degrees in a vertical direction, the light of the second beam pattern P2 is irradiated in a more downward direction than the light of the first beam pattern P2 to have an angle of about 15 degrees with the light of the first beam pattern P1 in order to prevent optical interference with the light of the first beam pattern P1.

For example, in the second exemplary embodiment of the present disclosure, the reflective surfaces of the first, second, and third reflectors 241, 242, and 243 that form the first beam pattern P1 and the reflective surfaces of the first, second, and third reflectors 241, 242, and 243 that form the second beam pattern P2 may be arranged along the vertical direction, but the present disclosure is not limited thereto. That is, the locations of the reflective surfaces of the first, second, and third reflectors 241, 242, and 243 that form the first beam pattern P1 and the locations of the reflective surfaces of the first, second, and third reflectors 241, 242, and 243 that form the second beam pattern P2 may vary.

Figure 21:
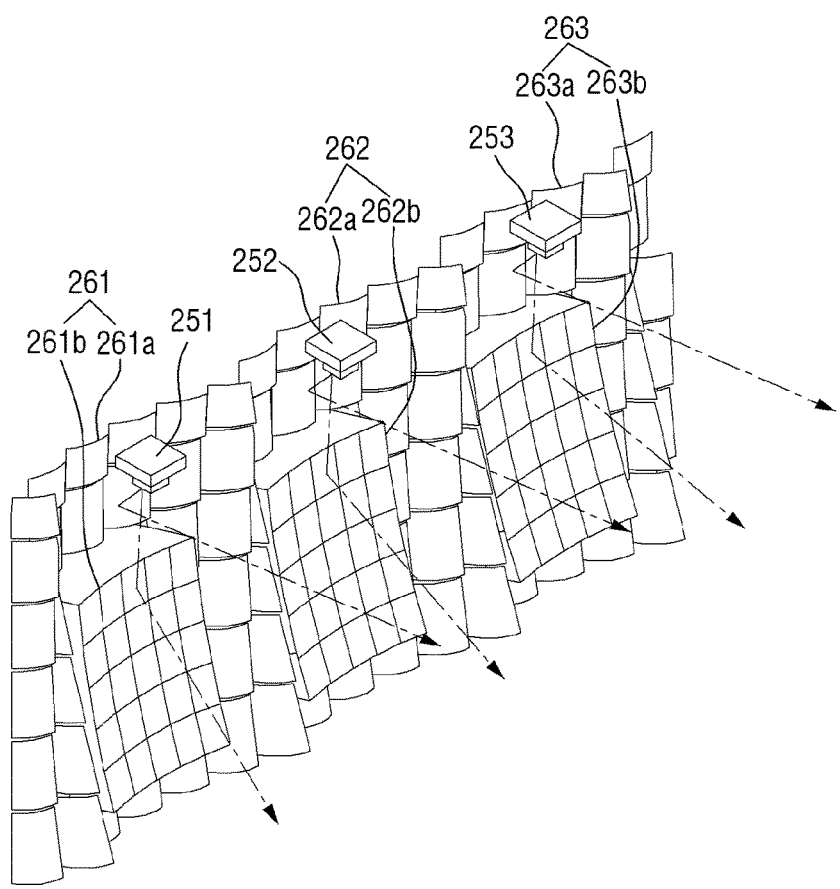
FIG. 21 is a perspective view of a lamp unit in accordance with a third exemplary embodiment of the present disclosure.
Figure 22:
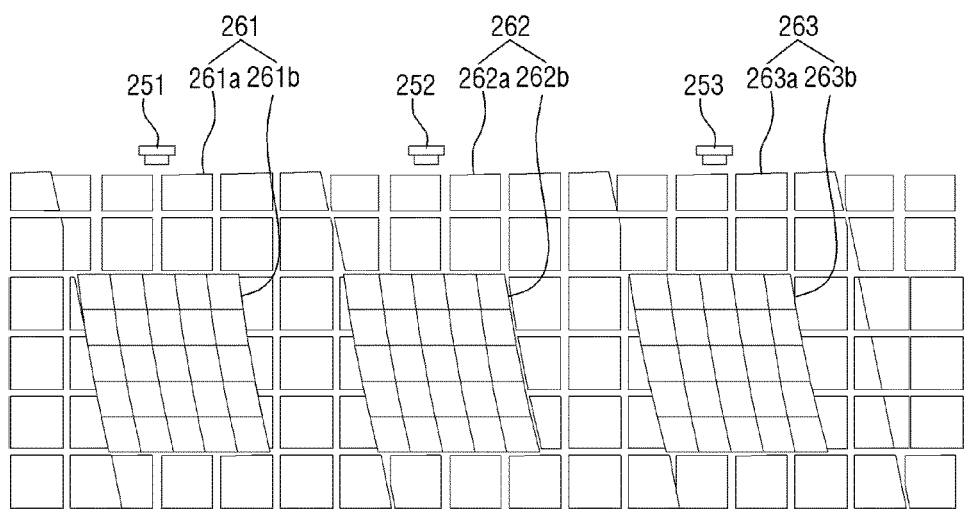
FIG. 22 is a front view of the lamp unit in accordance with the third exemplary embodiment of the present disclosure.

FIG. 21 is a perspective view of a lamp unit in accordance with a third embodiment of the present disclosure, and FIG. 22 is a front view of the lamp unit in accordance with the third exemplary embodiment of the present disclosure. Referring to FIGS. 21 and 22, a lamp unit 200 in accordance with the third embodiment of the present disclosure may include a plurality of light source parts 251, 252, and 253 and a plurality of reflectors 261, 262, and 263, which reflect light generated by the plurality of light source parts 251, 252, and 253 toward the rear of a vehicle 10.

In the third exemplary embodiment of the present disclosure, the plurality of light source parts 251, 252, and 253 may be arranged in a row in a horizontal direction and may be installed on the same substrate or on different substrates. In the third exemplary embodiment of the present disclosure, the plurality of reflectors 261, 262, and 263 may include reflective surfaces 261a, 262a, and 263a, respectively, which form a first beam pattern, and reflective surfaces 261b, 262b, and 263b, respectively, which are disposed in the reflection zones of the reflective surfaces 261a, 262a, and 263a, respectively, to form a second beam pattern. In the description that follows, the plurality of light source parts 251, 252, and 253 may be referred to as the first, second, and third light source parts 251, 252, and 253, respectively, and the plurality of reflectors 261, 262, and 263 may be referred to as the first, second, and third reflectors 261, 262, and 263, respectively.

In the third exemplary embodiment of the present disclosure, the plurality of light source parts 251, 252, and 253 may be located above the plurality of reflectors 261, 262, and 263 and may emit light downwardly, but the present disclosure is not limited thereto. That is, alternatively, the plurality of light source parts 251, 252, and 253 may be located below the plurality of reflectors 261, 262, and 263 and may emit light upwardly, in which case, the installation angles and the curvatures of the plurality of reflectors 261, 262, and 263 may be changed such that light can be reflected toward the rear of the vehicle 10.

For example, in the third exemplary embodiment of the present disclosure, the plurality of reflectors 261, 262, and 263 may be paired with the plurality of light source parts 251, 252, and 253, respectively, but the present disclosure is not limited thereto. That is, in an alternative example, at least two of the plurality of reflectors 261, 262, and 263 may reflect light generated by the same light source toward the rear of the vehicle 10, or light generated by at least two of the plurality of light source parts 251, 252, and 253 may be reflected toward the rear of the vehicle 10 by the same reflector. In this alternative example, the number of light source parts and the number of reflectors may differ from each other.

In the first reflector 261, some light generated by the first light source part 251 may be reflected toward the rear of the vehicle 10 by the reflective surface 261a, which forms a first beam pattern, and some other light generated by the first light source part 251 may be reflected toward the rear of the vehicle 10 by the reflective surface 261b, which forms a second beam pattern.

In the second or third reflector 262 or 263, like in the first reflector 261, some light generated by the second or third light source part 252 or 253 may be reflected toward the rear of the vehicle 10 by the reflective surface 262a or 263a, which forms a first beam pattern, and some other light generated by the second or third light source part 252 or 253 may be reflected toward the rear of the vehicle 10 by the reflective surface 262b or 263b, which forms a second beam pattern.

The first, second, and third reflectors 261, 262, and 263 may form the first and second beam patterns P1 and P2 of FIG. 19. For example, in the third exemplary embodiment of the present disclosure, the first reflector 261 may form the pattern area P21, which is the most distant pattern area from the vehicle 10, and the third reflector 263 may form the pattern area P23, which is the closest pattern area to the vehicle 10.

A light source corresponding with a pattern area distant from the vehicle 10 may have a greater light intensity than a light source corresponding with a pattern area less distant from the vehicle 10 so that the pattern areas P21, P22, and P23 can have uniform brightness. For example, the third light source part 253 may have a greater light intensity than the second light source part 252, and the second light source part 252 may have a greater light intensity than the first light source part 251.

In the third embodiment of the present disclosure, like in the second exemplary embodiment of the present disclosure, light reflected by the reflective surfaces 261a, 262a, and 263a, which form the first beam pattern P1, may be irradiated to a different area from light reflected by the reflective surfaces 261b, 262b, and 263b, which form the second beam pattern P2, and the light reflected by the reflective surfaces 261b, 262b, and 263b, which form the second beam pattern P2, may be irradiated in a more downward direction than the light reflected by the reflective surfaces 261a, 262a, and 263a, which form the first beam pattern P1.

For example, in the third exemplary embodiment of the present disclosure, the outer boundaries of the reflective surfaces 261b, 262b, and 263b, which form the second beam pattern P2, may be separated from the outer boundaries of the reflective surfaces 261a, 262a, and 263a, which form the first beam pattern P1, but the present disclosure is not limited thereto. That is, alternatively, at least some of the outer boundaries of the reflective surfaces 261b, 262b, and 263b, which form the second beam pattern P2, may overlap with the outer boundaries of the reflective surfaces 261a, 262a, and 263a, which form the first beam pattern P1.

In a case where the outer boundaries of the reflective surfaces 261b, 262b, and 263b, which form the second beam pattern P2, are separated from the outer boundaries of the reflective surfaces 261a, 262a, and 263a, which form the first beam pattern P1, whichever of the reflection zones of the reflective surfaces 261a, 262a, and 263a, which form the first beam pattern P1, is located below the reflective surfaces 261b, 262b, and 263b, which form the second beam pattern P2, not only reflects light, but also serves as a dummy reflective surface for improving the exterior of the lamp unit 200.

As described above, the automotive lamp 1 in accordance with the present disclosure forms a first beam pattern, which indicates the reverse movement of the vehicle 10, and also forms a second beam pattern, which is a road pattern formed on the road behind the vehicle 10 to indicate the reverse movement of the vehicle 10, thereby allowing ambient vehicles or pedestrians to easily recognize the reverse movement of the vehicle 10, even from a location where the reverse movement of the vehicle 10 is hardly detectable, and to make preparations.

In the automotive lamp in accordance with the present disclosure, at least one of the following effects may be obtained. By irradiating light of a road pattern indicating the reverse movement of the vehicle to an area behind the vehicle, even when an ambient vehicle approaching from one side behind the vehicle does not check a reversing lamp, it allows the ambient vehicle to recognize the reverse movement of the vehicle and make preparations. Further, by irradiating light of a road pattern indicating the reverse movement of the vehicle and light of a road pattern indicating that there is a dangerous factor, it is possible to prevent occurrence of a vehicle accident. Furthermore, by irradiating light of a road pattern indicating that the door of the vehicle is open, it allows an ambient vehicle to more easily check such situation.

The effects of the present disclosure are not limited thereto, and other effects of the present disclosure can be apparently understood from the description of claims. While the present disclosure has been particularly shown and described with reference to exemplary embodiments thereof, it will be understood by those of ordinary skill in the art that various changes in form and detail may be made therein without departing from the spirit and scope of the present disclosure as defined by the following claims.

The invention claimed is:

1. An automotive lamp, comprising;
   a lamp unit disposed in a rear lamp housing of a vehicle; and
   a detection unit configured to detect whether a reverse shift stage is selected,
   wherein the lamp unit is configured to irradiate a first light distribution pattern forming a reversing light signal pattern rearward of the vehicle, and a second light distribution pattern forming a road pattern on the rearward road surface of the vehicle,
   wherein the first light distribution pattern and the second light distribution pattern are formed simultaneously, when the reverse shift stage is selected, and
   wherein the second light distribution pattern is irradiated with a greater luminesce intensity than the first light distribution pattern.

2. The automotive lamp of claim 1, wherein the lamp unit includes a plurality of light sources that each form individual road patterns.

3. The automotive lamp of claim 2, wherein the second light distribution pattern that forms a plurality of road patterns on the rearward road surface of the vehicle, and the light source that corresponds to the road surface pattern disposed a greater distance from the vehicle has a greater luminance intensity.

4. The automotive lamp of claim 1, wherein the lamp unit includes a reflector configured to reflect a light irradiated from a light source toward a rearward direction of the vehicle.

5. The automotive lamp of claim 4, wherein the light source is disposed on the upper side of the reflector.

6. The automotive lamp of claim 4, wherein the light source is disposed on the lower side of the reflector.

7. The automotive lamp of claim 4, wherein the reflector includes a first reflective surface that forms the first light distribution pattern, and a second reflective surface that forms the second light distribution pattern.

8. The automotive lamp of claim 7, wherein the first reflective surface and the second reflective surface are coupled with the light source.

9. The automotive lamp of claim 1, wherein the first light distribution pattern is configured to irradiate toward a first direction, and the second light distribution pattern is configured to irradiate toward a second direction.

10. The automotive lamp of claim 1, wherein the first light distribution pattern and the second light distribution pattern are illuminated in separate areas from each other.

11. The automotive lamp of claim 1, wherein the road patterns is disposed parallel to the central line C of the vehicle.

12. The automotive lamp of claim 1, wherein the road pattern is formed in an acute angle from the central line C.

13. The automotive lamp of claim 1, wherein the shape of the road pattern is a straight line.

14. The automotive lamp of claim 1, wherein the shape of the road pattern is circular.

15. The automotive lamp of claim 1, wherein the interval of each of the plurality of road patterns gradually increases as the distance from the vehicle increases.

16. The automotive lamp of claim 1, wherein the interval of each of the plurality of road patterns are equal.

17. The automotive lamp of claim 1, wherein the shape of the road pattern is rectangular.

18. The automotive lamp of claim 17, wherein the plurality of rectangular road patterns are greater in width and height as the distance from the vehicle increases.

19. The automotive lamp of claim 18, wherein each of the plurality of rectangular road patterns has the same width, and the height becomes greater as the distance from the vehicle increases.

* * * * *